(12) United States Patent
Tao et al.

(10) Patent No.: US 8,917,482 B2
(45) Date of Patent: Dec. 23, 2014

(54) DISTRIBUTION OF MASS IN VERTICAL AXIS FOR HGA FLEXURE MODE CONTROL

(75) Inventors: Kathryn Chuan Tao, Clayton, CA (US); Stephen Paul Williams, Morgan Hill, CA (US)

(73) Assignee: HGST Netherlands B.V., Amsterdam (NL)

(*) Notice: Subject to any disclaimer, the term of this patent is extended or adjusted under 35 U.S.C. 154(b) by 14 days.

(21) Appl. No.: 13/546,774

(22) Filed: Jul. 11, 2012

(65) Prior Publication Data

US 2014/0016228 A1  Jan. 16, 2014

(51) Int. Cl.
G11B 5/48 (2006.01)

(52) U.S. Cl.
USPC ........................................ 360/245.4

(58) Field of Classification Search
USPC ............... 360/244.2–245.7, 246.1–246.5
See application file for complete search history.

(56) References Cited

U.S. PATENT DOCUMENTS

| | | | |
|---|---|---|---|
| 5,057,953 A | 10/1991 | Wanlass | |
| 5,130,871 A | 7/1992 | Whitmore | |
| 5,471,734 A | 12/1995 | Hatch et al. | |
| 5,850,319 A * | 12/1998 | Tangren | 360/244.9 |
| 6,104,572 A | 8/2000 | Williams et al. | |
| 6,614,626 B2 | 9/2003 | Raphael et al. | |
| 7,009,799 B2 | 3/2006 | Sassolini et al. | |
| 7,280,316 B1 | 10/2007 | McCaslin et al. | |
| 7,542,241 B1 | 6/2009 | Khan et al. | |
| 2008/0144223 A1 * | 6/2008 | Muraki et al. | 360/244.8 |
| 2010/0271732 A1 * | 10/2010 | Fujimoto | 360/234 |

FOREIGN PATENT DOCUMENTS

WO  WO 9707502 A1 *  2/1997 ............. G11B 5/596

OTHER PUBLICATIONS

Shigeo Nakamura et al., Flow-Induced Vibration of Head Gimbal Assembly, IEEE Transactions on Magnetics, vol. 40, No. 4, Jul. 2004, pp. 3198-3200.
Young-Hoon Kim et al., PES Reduction in Magnetic Disk Drives via a Low-TMR HGA and Servo Loop Shaping, IEEE Transactions on Magnetics, vol. 41, No. 2, Feb. 2005, pp. 779-783.
Yunfeng Li et al., Vibration Control of a PZT Actuated Suspension Dual-Stage Servo System Using a PZT Sensor, IEEE Transactions on Magnetics, vol. 39, No. 2, Mar. 2003, pp. 932-937.

* cited by examiner

Primary Examiner — Nathan Danielsen
(74) Attorney, Agent, or Firm — Brokaw Patent Law PC; Christopher J. Brokaw

(57) ABSTRACT

Approaches for a hard-disk drive (HDD) and a head gimbal assembly comprising techniques for forming the gimbal legs in a head gimbal assembly (HGA) in a manner to shift the distribution of mass of the HGA that results in controlling the magnitude of resonance gain associated with the HGA during operation of a hard-disk drive.

18 Claims, 7 Drawing Sheets

US 8,917,482 B2

DISTRIBUTION OF MASS IN VERTICAL AXIS FOR HGA FLEXURE MODE CONTROL

FIELD OF THE INVENTION

Embodiments of the invention relate to distributing mass of components within a hard-disk drive (HDD) to affect structural resonances.

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When a HDD is in operation, each magnetic-recording disk is rapidly rotated by a spindle system. Data is read from and written to a magnetic-recording disk using a read/write head (hereinafter "head"), which is positioned over a specific location of a disk by an actuator.

A head uses a magnetic field to read data from and write data to the surface of a magnetic-recording disk. As a magnetic dipole field decreases rapidly with distance from a magnetic pole, the distance between a head and the surface of a magnetic-recording disk must be tightly controlled. An actuator relies on a suspension's force on the head to provide the proper distance between the head and the surface of the magnetic-recording disk while the magnetic-recording disk rotates. A head therefore is said to "fly" over the surface of the magnetic-recording disk.

Demand for increased HDD storage capacity has led to efforts to pack more bits onto disks. This increased density of bits, as well as increased rotational speed of the disks, requires highly accurate head tracking in order to minimize read/write errors. Advances in head gimbal assembly (HGA) have enabled smaller and lighter heads; however, these heads are subject to structural modes of the suspension; namely, the presence of high gain flexure modes which can cause head offtrack in Repeatable Runout (RRO) and Non-Repeatable Runout (NRRO). Adding support to HGAs in an effort to reduce and minimize amplitudes and coupling of these modes have negatively impacted pitch and roll stiffness values. Therefore, it is advantageous to minimize structural modes without requiring additional structural components or affecting separate dynamic characteristics of the HDD.

SUMMARY OF THE INVENTION

Approaches described herein teach techniques for forming the gimbal legs in a head gimbal assembly (HGA) in a manner to shift the distribution of mass of the HGA that results in controlling the magnitude of resonance gain associated with the HGA during operation of a hard-disk drive.

According to an embodiment, a hard disk drive is provided comprising a head attached to a slider, a disk rotatably mounted on a spindle, a drive motor having a motor shaft attached to the spindle for rotating the disk, a voice-coil motor configured to move the head to access portions of the disk, and a flexure attached to the slider. The flexure is attached to a suspension assembly with flexure legs, where the flexure legs are separated from the flexure and formed in a curved fashion, resulting in the mass of the HGA being redistributed along a vertical axis.

According to an embodiment, a hard disk drive is provided comprising a head attached to a slider, a disk rotatably mounted on a spindle, a drive motor having a motor shaft attached to the spindle for rotating the disk, a voice-coil motor configured to move the head to access portions of the disk, and a flexure attached to the slider. The flexure is separated into a first and second portion. The first portion is shaped in a curved fashion, resulting in the mass of the HGA being redistributed in the direction of the curve.

According to an embodiment, a head gimbal assembly (HGA) is provided comprising a head attached to a slider, the slider being coupled to a flexure gimbal assembly, a loadbeam assembly attached to the slider and a suspension attached to the flexure gimbal assembly by flexure legs. The flexure legs are curved such that the mass of the HGA is redistributed upwards along a vertical axis, and the curvature of the flexure legs results in a reduction of a magnitude of resonance gain associated with the HGA during operation of a hard-disk drive.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches are described herein for forming the gimbal legs in a head gimbal assembly (HGA) in a manner to control the resonances of the HGA. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
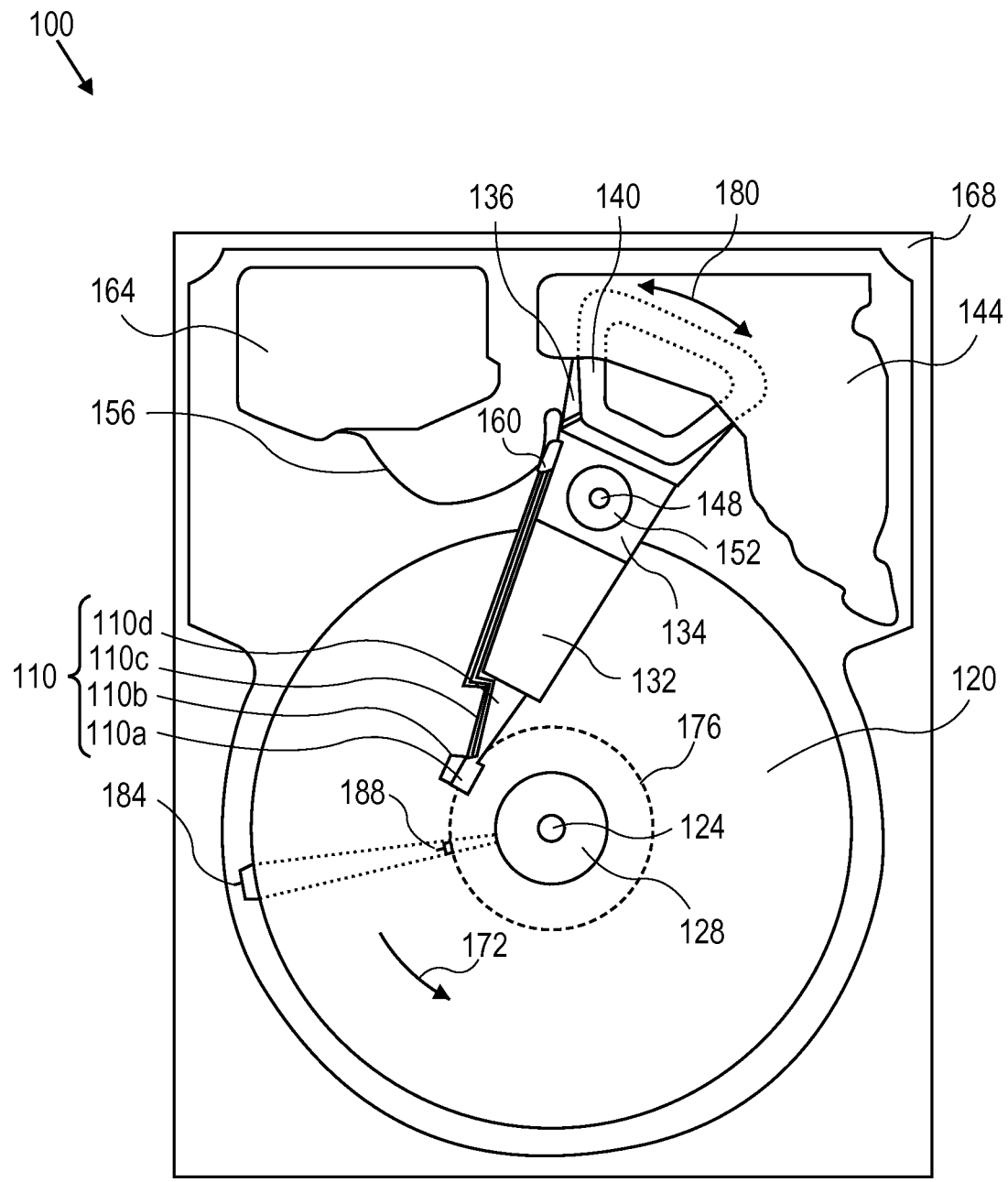
FIG. 1 is a plan view of an HDD according to an embodiment of the invention.

Embodiments of the invention may be used to distribute mass of components within a hard-disk drive (HDD) to affect structural resonances. Embodiments of the invention may be incorporated with a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head 110a, a lead suspension 110c attached to the head 110a, and a loadbeam 110d attached to the slider 110b, which includes the head 110a at a distal end of the slider 110b; the slider 110b is attached at the distal end of the loadbeam 110d to a gimbal portion of the loadbeam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 2:
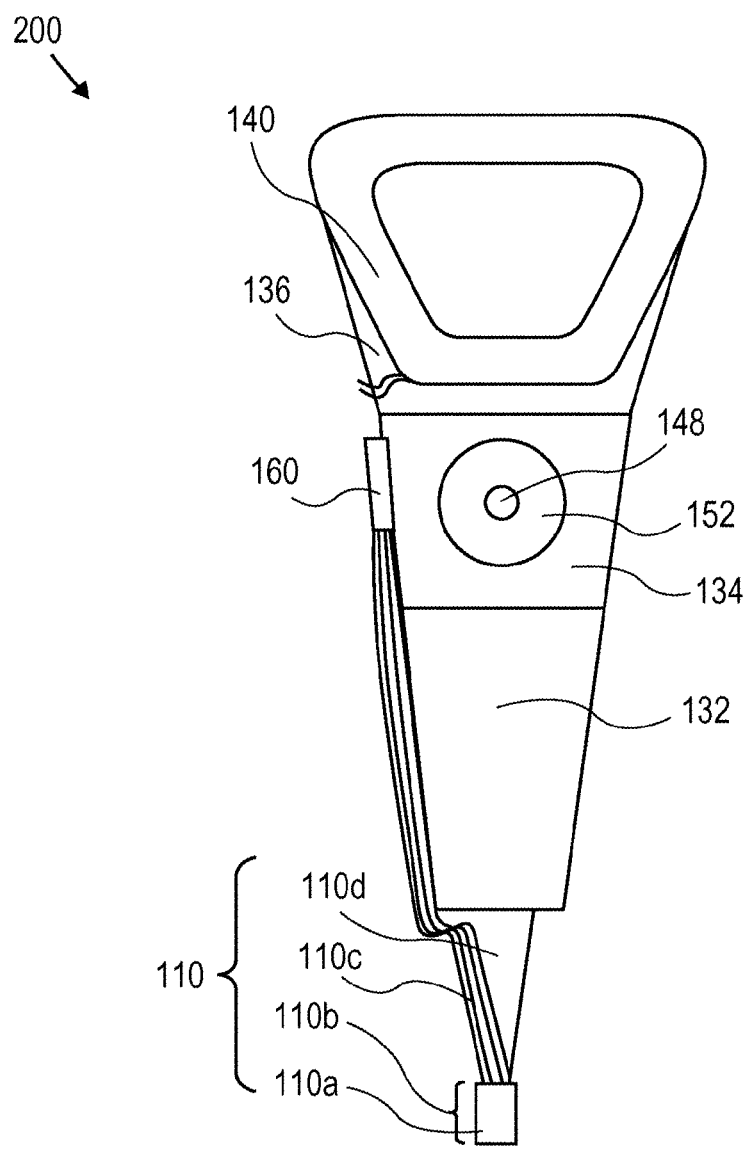
FIG. 2 is a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Adjusting Flexure Legs to Control Structural Resonances

Embodiments of the invention are directed toward approaches for forming the flexure legs of a HGA in order to control resonance gains resulting from structural aspects of the HGA during operation of the HDD. According to an embodiment, the flexure legs are formed towards the disk surface, thereby distributing the mass centerline of the suspension towards the disk, as discussed herein. The forming height of the flexure legs may be adjusted to tune out structural resonances of the gimbal, as described herein.

Figure 3:
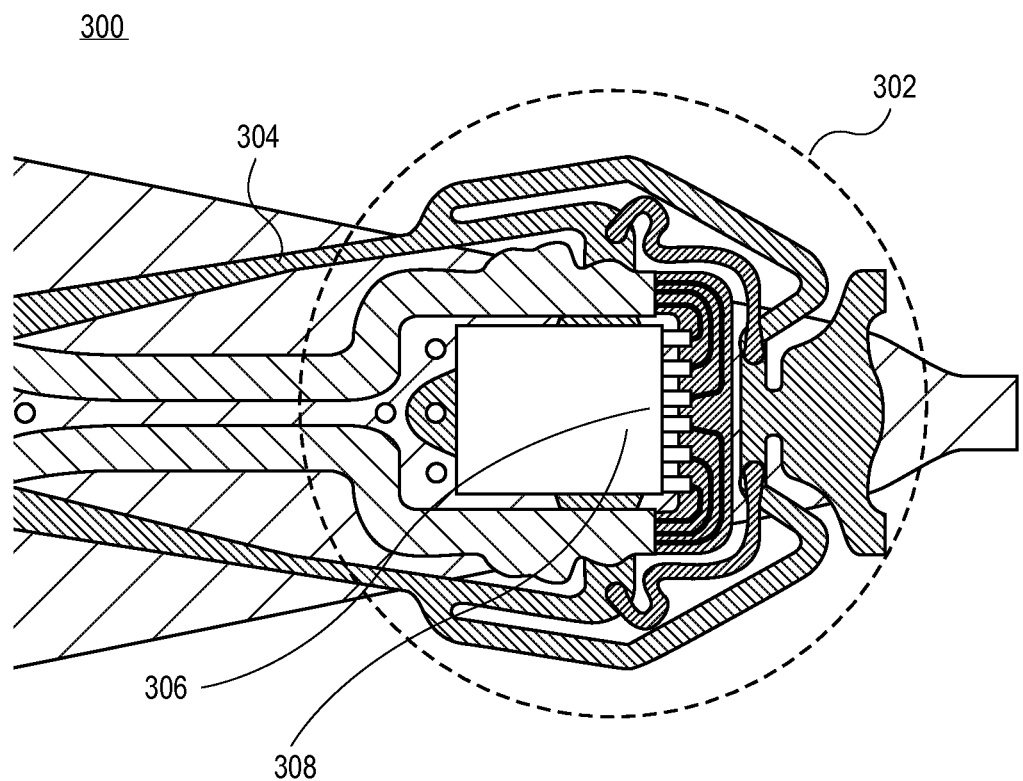
FIG. 3 is a bottom view illustration of a HGA employed by embodiments of the approaches described herein.

FIG. 3 is a bottom view (disk-side) illustration of a HGA employed by embodiments of the approaches described herein. In the embodiment of FIG. 3, there is pictured a flexure gimbal 302 structure in which is disposed the head 306 and slider 308. The flexure gimbal structure 302 is attached to the suspension (not pictured) by flexure legs 304 and operates to gimbal the head and slider to the disk (not pictured) during operation of the HDD, as described further herein.

Figure 4A:
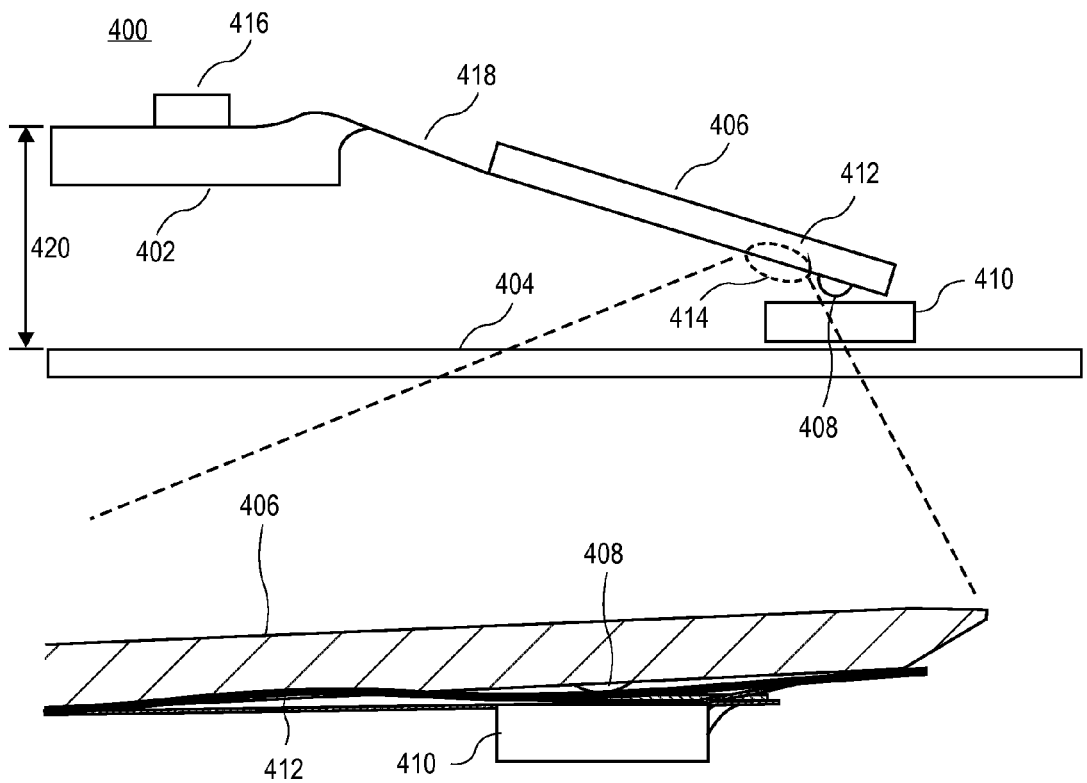
FIG. 4A is an exploded side-view illustration of a loadbeam assembly and HGA having flexure legs formed away from the disk in accordance with an embodiment.
Figure 4B:
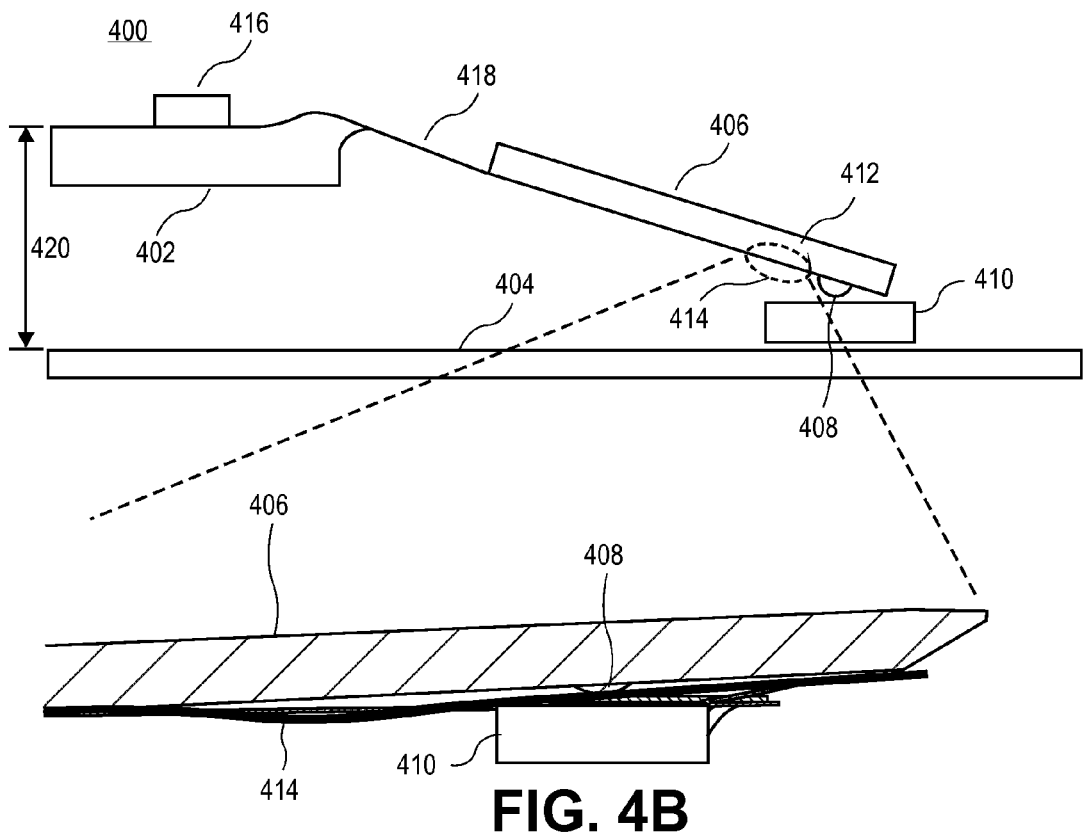
FIG. 4B is an exploded side-view illustration of a loadbeam assembly and HGA having flexure legs formed towards the disk in accordance with an embodiment.

FIGS. 4A and 4B are side view illustrations of a loadbeam assembly and HGA 400 having flexure legs formed either towards or away from the disk in accordance with an embodiment. The loadbeam assembly and HGA 400 comprise a rigid baseplate or mount plate 402, which may include an integral swaging boss 416 for mounting the suspension to an actuator arm. A spring section 418 connects baseplate 402 to the loadbeam 406. A dimple 408 is formed into loadbeam 406 that allows the flexure legs 412, 414 to gimbal the slider 410 to rotate and comply to the surface of the disk 404. According to an embodiment, the flexure legs are either bent away from the disk 412 or toward the disk 414. It should be understood that, according to an embodiment, the flexure legs are both either bent away from the disk 412 or toward the disk 414, not both at the same time. For a more accurate depiction of the shape and positioning of flexure legs 412, 414, FIGS. 4A and 4B are illustrative. Flexure legs 412, 414 are part of a flexure (not pictured), which is a thin stainless structure on which slider 410 is joined. The distance 420 from the top of baseplate 402 to the surface of slider 410 which contacts disk 404 may be referred to herein as the "z-height." 420

The flexure legs 412, 414 may be formed towards 414 disk 404 or away 412 depending on the type of structural resonances desired to be controlled. As forced input is given to baseplate 402, for example during a seeking operation, there will be a response at slider 410. This response may contain frequency content that excites modes causing slider 410 to yaw back and forth in response to the forced input. The forced input can also come from windage excitation as molecules of induced flow off the disks and HDD structure impinge upon the HGA components, resulting in NRRO offtrack motion. During HDD operation, the flexure modes may be excited both by VCM or Milli/micro actuator forcing or by windage excitation. Also, when the flexure leg forming is optimized (as discussed below), both of these are in practice minimized. If the VCM/milli/micro/windage forcing function has the frequency content that corresponds with the flexure modes of vibration, they are excited and off track motion is produced. The flexure leg forming described herein reduces the amplitude of this motion as the null point is approached. The flexure (not pictured) may comprise two legs that bend up and down in response to the forced input, which results in yawing motion of slider 410. In essence, the motion is a bending of flexure legs, which results in yawing of the gimbal area to which the slider is attached. A yawing motion to slider 410 causes offtrack motion of the head on the disk. These yaw modes may also be referred to as structural resonances or flexure modes.

The lower frequency flexure mode is FX1 (first flexure mode). In FX1, torsion on loadbeam 406 pushes on dimple 408, which causes slider 410 to translate back and forth in a horizontal plane. In FX1, individual flexure legs exhibit first bending (one node or inflection point), with each leg bending out of phase with the opposite leg. The higher frequency flexure mode is FX2 (second flexure mode). In FX2, the legs of loadbeam 406 twist, which causes yawing of slider 410. In FX2, individual flexure legs exhibit second bending (two nodes or inflection points), with each leg bending out of phase with the opposite leg. The bending motion of each leg in opposing directions causes yawing of the flexure tongue onto which the slider is fixed. For clarity, FX1 and FX2 modes may be more effectively described as flexure leg bending modes.

For each mode there is a resonance gain associated with the vibration frequency. These resonance gains can be reduced or controlled by redistributing mass along the z-height 420. By adjusting this mass, one may find a "null point" so that there is no motion on slider 410 when entering these flexure modes. The null point may be defined as a minima for slider offtrack motion. At this minima point, the excited flexure mode does not cause offtrack motion of the slider. At values below and above the null point, flexure modes will lead to increasing offtrack motion of the slider, which can be depicted in a frequency response transfer function as either a pole-zero or a zero-pole resonance.

According to an embodiment, this distribution of mass may be accomplished by forming the flexure legs away or toward the disk such that head offtrack is reduced towards zero. Head offtrack may be defined as the deviation from track center by the read/write transducer in the slider. This adjustment of the forming parameters for the attitude of the flexure legs causes a change in the vertical distribution of mass of the HGA flexure gimbal and operates to control peak gains of flexure leg bending modes and the resultant yawing of the slider 410. The flexure legs are separated away from the flexure and impinge into the plane above or below the slider depending on the particular embodiment.

FIG. 4A is an exploded side-view illustration of a loadbeam assembly and HGA having flexure legs 412 formed away from the disk in accordance with an embodiment. The flexure legs 412 (depicted in solid black) are bent up into the plane of loadbeam 406 at a given point. According to example embodiments, the particular location of the upward bend may be adjusted as necessary to control flexure leg bending modes.

FIG. 4B is an exploded side-view illustration of a loadbeam assembly and HGA having flexure legs 414 formed towards the disk in accordance with an embodiment. The flexure legs 414 (depicted in solid black) are bent away from the plane of loadbeam 406 at a given point. According to example embodiments, the particular location of the upward bend may be adjusted as necessary to control flexure leg bending modes.

Figure 5:
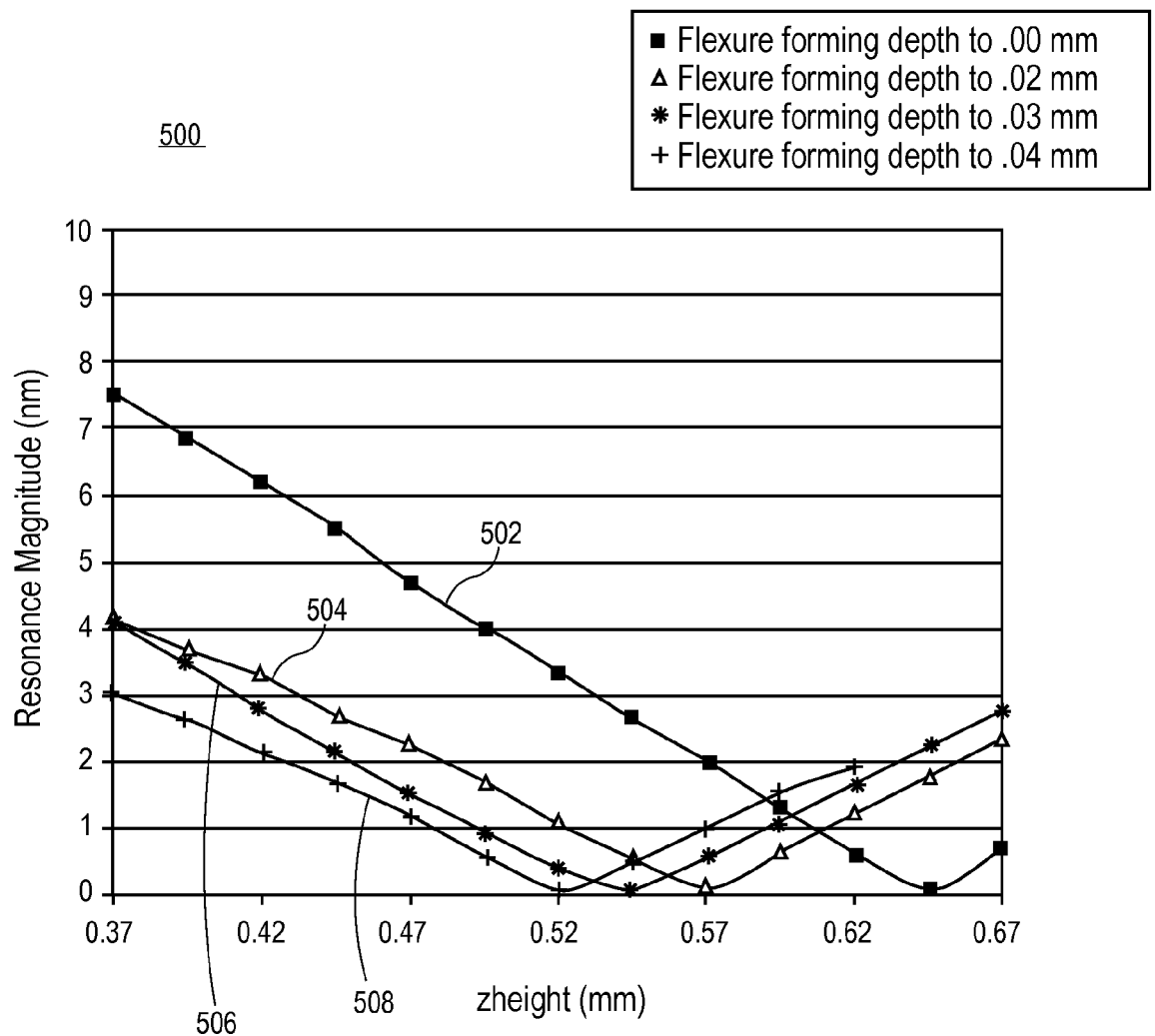
FIG. 5 is a graph illustrating the optimization of flexure mode FX1 at various z-heights with different flexure formings.

FIG. 5 is a graph 500 illustrating the optimization of mode FX1 at various z-heights with different flexure formings. The vertical axis is the relative magnitude of the resonance, in response to a given input forcing function, and the horizontal axis is z-height. At a nominal z-height of 0.52 mm, a flexure with no forming 502 results in a relative magnitude of around 3 nm of resonance displacement response. A flexure forming depth to 0.02 mm 504 toward the disk results in a relative magnitude of about 1 nm of resonance displacement response. A flexure forming depth to 0.03 mm 506 toward the disk results in a relative magnitude of about 0.5 nm of resonance displacement response. A flexure forming depth to 0.04 mm 508 toward the disk results in a nulling out of the FX1 resonance. It is important to note that flexure forming depths with a positive forming depth, as in FIG. 5, is where the flexures are formed towards the disk, thereby adjusting the mass of the HGA flexure towards the disk.

FIG. 5 demonstrates that relative magnitude due to FX1 varies with z-height, the trend lines 502-508 taking on a "V" shape with a minima where the relative magnitude approaches zero. In the example of FIG. 5, this minima can be shifted towards the nominal z-height of 0.52 by increasing the flexure leg forming to 0.04 towards the disk. This correlates with no head offtrack due to FX1 at nominal z-height conditions.

Figure 6:
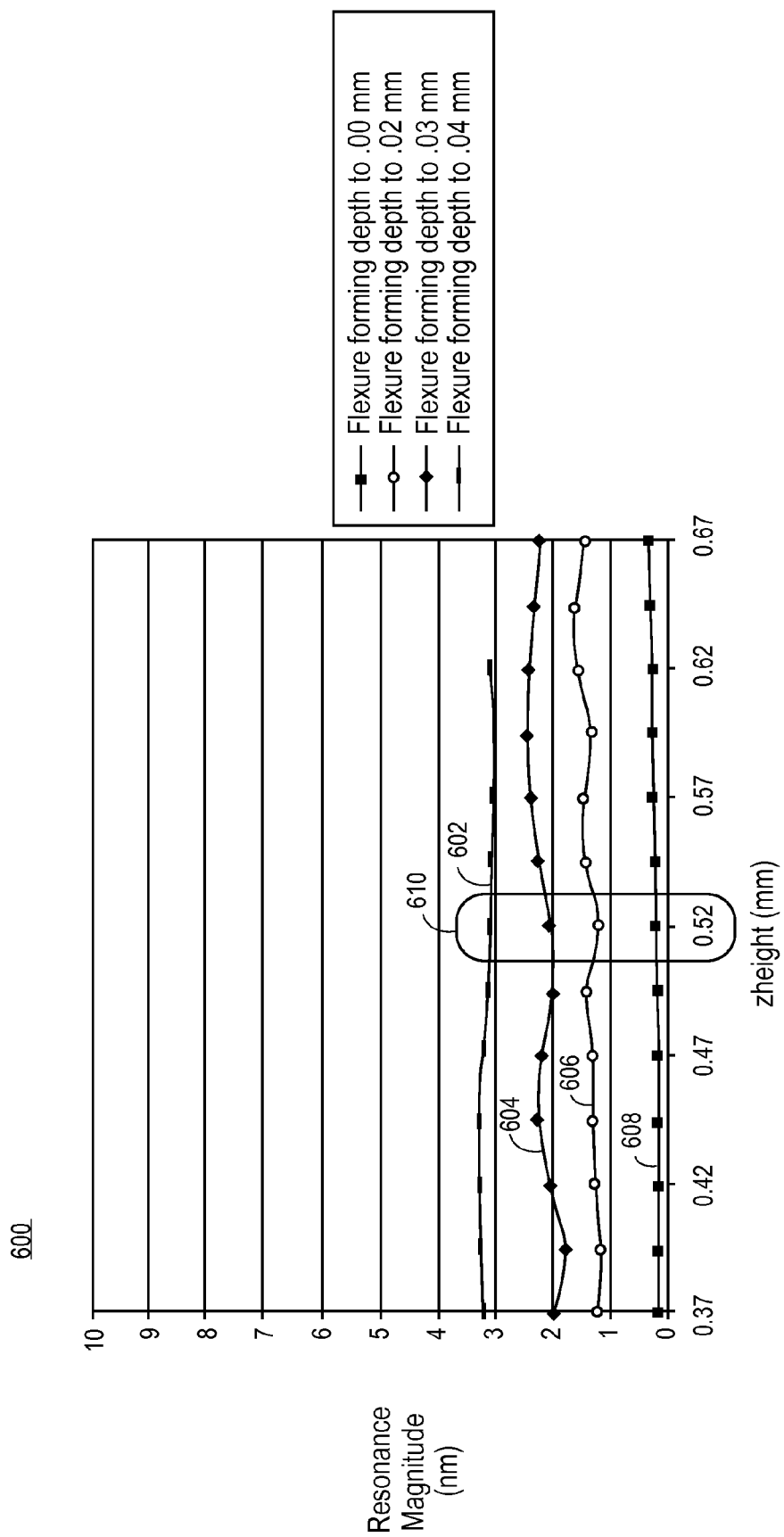
FIG. 6 is a graph illustrating the optimization of flexure mode FX2 at various z-heights with different flexure formings.

FIG. 6 is a graph 600 illustrating the optimization of FX2 at various z-heights with different flexure formings. The vertical axis is the relative magnitude of the resonance and the horizontal axis is z-height. Because there is a sensitivity to embodiments of the flexure leg formings to FX1 optimization as well as FX2 optimizations, FIG. 6 illustrates that forming the flexure legs towards the disk has an adverse effect on FX2. At a nominal z-height of 0.52 mm 610, a flexure with no forming 602 results in a minimal level of FX2 resonance, while the same forming served to optimize for FX1 resonance in FIG. 5. The flexure forming which serves to optimize for FX1 in FIG. 5, degrades resonance performance for FX2; no forming results in a minimal level of FX2 resonance. A flexure forming depth to 0.02 mm toward the disk 604 results in a relative magnitude of about 1 nm of resonance displacement response. A flexure forming depth to 0.03 mm 606 results in a relative magnitude of about 2 nm of resonance displacement response. A flexure forming depth to 0.04 mm 608 results in a relative magnitude of about 3 nm of resonance displacement response.

Figure 7:
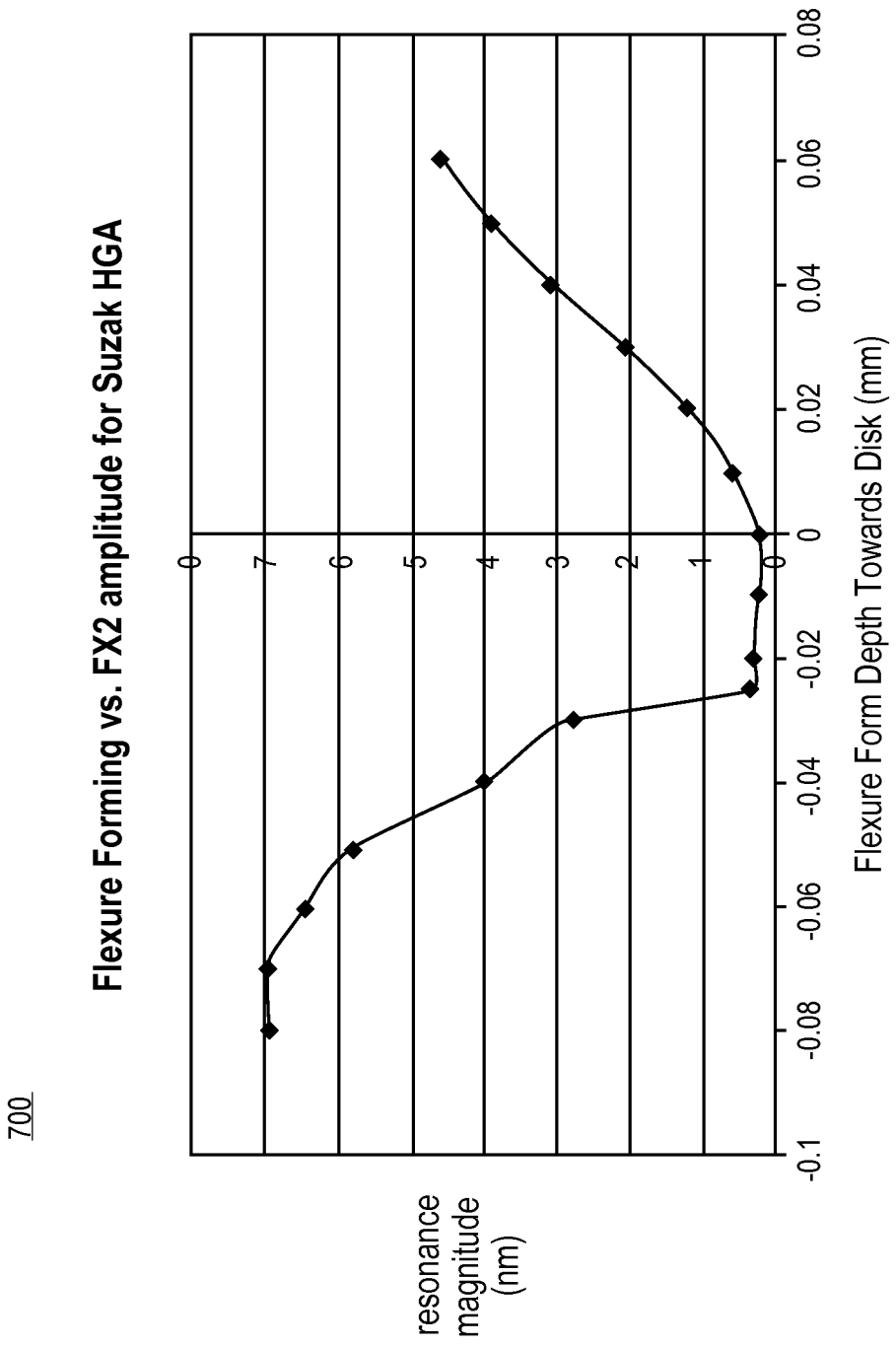
FIG. 7 is a graph illustrating a relationship between the resonance (or amplitude) for FX2 at different flexure forming depths.

FIG. 7 is a graph 700 illustrating a relationship between the resonance (or magnitude) for FX2 at different flexure forming depths. By adjusting the flexure height in the z-axis (up/down, in the same direction as the z-height 520) one can control for structural resonances. At zero on the x-axis, the flexure legs in what may be considered a "normal" position. They transition from the loadbeam surface up to the slider tongue surface onto which the slider is fixed. Traveling to the right on the x-axis, the flexure legs are being formed in a curvature towards the disk. Traveling to the left on the x-axis, the flexure legs are being formed in a curvature away from the disk. According to an embodiment, FX2 may be optimally controlled by bending the flexure legs away from the disk. Keeping the flexure legs in a "normal" position or bent towards the disk is an unoptimized position to control this particular structural resonance. As evidenced from FIG. 7, the overall plot takes almost a "U" shaped curve, providing a "valley" where offtrack motion and response magnitude is minimized. Further negative beyond this valley causes offtrack motion to increase, similarly to going too far positive.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
a head attached to a slider;
a disk rotatably mounted on a spindle;
a drive motor having a motor shaft attached to the spindle for rotating the disk;
a voice-coil motor configured to move the head to access portions of the disk; and
a flexure attached to the slider comprising a head gimbal assembly (HGA), wherein the flexure is attached to a suspension assembly with flexure legs, the flexure legs being separated from the flexure and formed in a curved fashion such that the mass of the HGA is redistributed along a vertical axis,
wherein the location of an upward bend of the flexure legs and the distribution of mass along the flexure legs results in a minima of offtrack motion for the slider in both (a) flexure first mode (FX1) and (b) flexure second mode (FX2) during operation of the hard-disk drive.

2. The hard-disk drive of claim 1, wherein the flexure legs are formed in a curved fashion away from the disk.

3. The hard-disk drive of claim 1, wherein the flexure legs are formed in a curved fashion towards the disk.

4. The hard-disk drive of claim 3, wherein the curvature of the flexure legs towards the disk reduces a magnitude of resonance gain associated with the HGA during operation of the hard-disk drive.

5. The hard-disk drive of claim 4, wherein the resonance gain comprises flexure first mode (FX1).

6. The hard-disk drive of claim 1, wherein an arc of a curved portion of the flexure legs is symmetrical.

7. The hard-disk drive of claim 1, wherein a curved portion of the flexure legs inflects towards the mount plate along the z-axis.

8. The hard-disk drive of claim 1, wherein a curved portion of the flexure legs inflects towards the distal end of the HGA.

9. The hard-disk drive of claim 1, wherein the flexure comprises stainless steel.

10. The hard-disk drive of claim 1, wherein the flexure has a nominal z-height of 0.52 mm.

11. A hard-disk drive, comprising:
a head attached to a slider;
a disk rotatably mounted on a spindle;
a drive motor having a motor shaft attached to the spindle for rotating the disk;
a voice-coil motor configured to move the head to access portions of the disk; and
a flexure attached to the slider comprising a head gimbal assembly (HGA), wherein the flexure is separated into a first and second portion, the first portion being shaped in a curved fashion such that the mass of the HGA is redistributed in the direction of the curve,
wherein the location of an upward bend of the flexure legs and the distribution of mass along the flexure legs results in a minima of offtrack motion for the slider in both (a) flexure first mode (FX1) and (b) flexure second mode (FX2) during operation of the hard-disk drive.

12. The hard-disk drive of claim 11, wherein the first portion is shaped in a curve towards the disk.

13. The hard-disk drive of claim 12, wherein the curvature of the flexure legs towards the disk reduces a magnitude of flexure first mode associated with the HGA during operation of the hard-disk drive.

14. The hard-disk drive of claim 11, wherein the first portion is shaped in a curve away from the disk.

15. The hard-disk drive of claim 11, wherein the flexure has a nominal z-height of 0.52 mm.

16. A head gimbal assembly (HGA), comprising:
a head attached to a slider, the slider being coupled to a flexure gimbal assembly;
a loadbeam assembly attached to the slider; and
a suspension attached to the flexure gimbal assembly by flexure legs, wherein the flexure legs are curved such that the mass of the HGA is redistributed upwards along a vertical axis, such that the curvature of the flexure legs reduces a magnitude of resonance gain associated with the HGA during operation of a hard-disk drive,
wherein the location of an upward bend of the flexure legs and the distribution of mass along the flexure legs results in a minima of offtrack motion for the slider in both (a) flexure first mode (FX1) and (b) flexure second mode (FX2) during operation of the hard-disk drive.

17. The head gimbal assembly of claim 16, wherein the resonance gain comprises flexure first mode (FX1).

18. The head gimbal assembly of claim 16, wherein the flexure legs have a nominal z-height of 0.52 mm.

* * * * *